March 2, 1965  E. J. DIEBOLD  3,172,093
MONITORING ARRANGEMENT FOR POWER CONVERTER
Filed Feb. 12, 1959  2 Sheets-Sheet 1

INVENTOR.
EDWARD J. DIEBOLD
BY
ATTORNEYS.

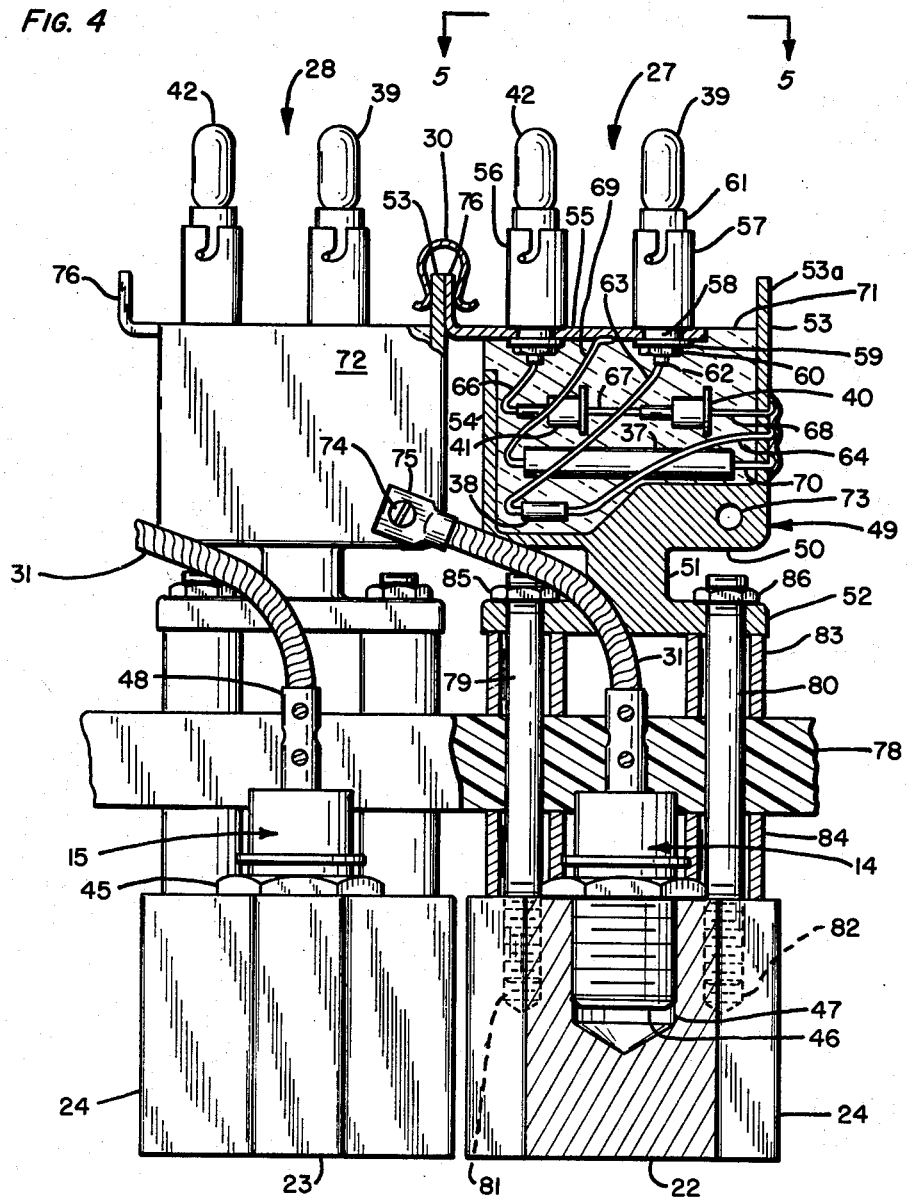
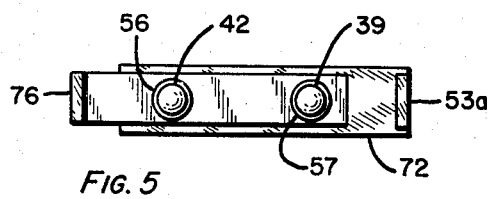
FIG. 4
FIG. 5
INVENTOR.
EDWARD J. DIEBOLD
BY
ATTORNEYS.

United States Patent Office 3,172,093
Patented Mar. 2, 1965

3,172,093
MONITORING ARRANGEMENT FOR POWER CONVERTER
Edward J. Diebold, Palos Verdes Estates, Calif., assignor to International Rectifier Corporation, El Segundo, Calif., a corporation of California
Filed Feb. 12, 1959, Ser. No. 792,790
8 Claims. (Cl. 340—253)

This invention relates to rectifying circuits and more particularly to monitoring arrangements for such circuits.

An object of the invention is to provide a system for monitoring a circuit comprising a plurality of rectifying elements so that a malfunction of any of them can readily be indicated. A related object is to enable a rectifying element readily to be removed and replaced in a system.

In the use of power converters, particularly those using semi-conductor rectifier elements, it is a common practice for the purpose of obtaining desired magnitudes of currents and voltages, to connect a number of rectifying elements in series in a branch and also to connect a number of such branches in parallel with each other. This commonly involves the use of a substantial number of individual rectifier elements or units. It sometimes happens that a unit in such an arrangement may fail or become defective and such failure may result in realizing less than the desired power output, or in imposing more voltage across some elements than is desired. For this reason it is desirable to be able to detect readily the presence of a defective element and to replace it before such defect has time to cause other damage or produce further imbalance of the system.

In accordance with the present invention, monitoring units or circuits are associated with the respective power rectifier elements in such a way as to detect and indicate the condition of other than a normal current flow or a normal voltage across the elements.

Features of the monitoring units comprise the use of by-pass resistance across the power rectifier element so that when several such rectifier elements are connected in series, equal voltage division is obtained across the elements.

Another feature involves means for indicating the condition of short-circuiting of a power rectifier element.

Still another feature involves means for indicating the condition of open circuit of a power rectifier element. This is carried out by use of a pair of rectifier elements in series with an indicator. By this arrangement the indicator will point to the power rectifier unit which is open-circuited.

The condition of short-circuit of a unit is carried out by a branch in the monitoring system comprising a resistor in series with another indicator.

A further feature of the invention resides in the construction of an individual monitoring system whereby it can be attached or detached from its associated power rectifier element as a unit. Preferably the elements of such monitoring systems are sealed in a suitable sealing compound.

The foregoing and other features of the invention will be better understood from the following detailed description and the accompanying drawings of which:

FIG. 4 shows, partly in cross-section, a pair of the power rectifier elements shown in FIG. 2 together with their individual monitoring systems; and FIG. 5 is a top view of one of the monitoring systems taken at line 5—5 of FIG. 4.

Figure 1:
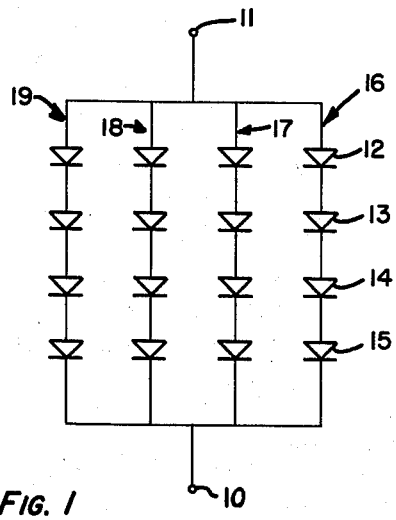
FIG. 1 shows a typical power converter system comprising a plurality of parallel branches each having a plurality of individual power rectifier elements in series.

Referring to the drawings, FIG. 1 shows a typical system of rectifier elements connected between a pair of terminals 10 and 11 which it is understood may be connected into some electrical system, not shown. When the voltage between terminals 10 and 11 is higher than that which it is safe to place across a single rectifier element in the direction of reverse current flow, several rectifier elements are connected in series so that the voltage across each element will not exceed its safe voltage. Accordingly, there is illustrated in FIG. 1 a string 16 of rectifiers 12, 13, 14, and 15 in series between terminals 10 and 11. In cases where it is desired to provide more current flow in the forward direction between terminals 10 and 11 than can reasonably be sent through the said string of rectifiers, it is common to provide parallel strings or branches containing rectifiers; and there are accordingly illustrated in FIG. 1 parallel branches 17, 18 and 19 in addition to the branch or string 16; and each parallel branch or string is shown to contain four rectifier elements in series, although it will be understood that any other number of rectifier elements may be used if desired.

Figure 2:
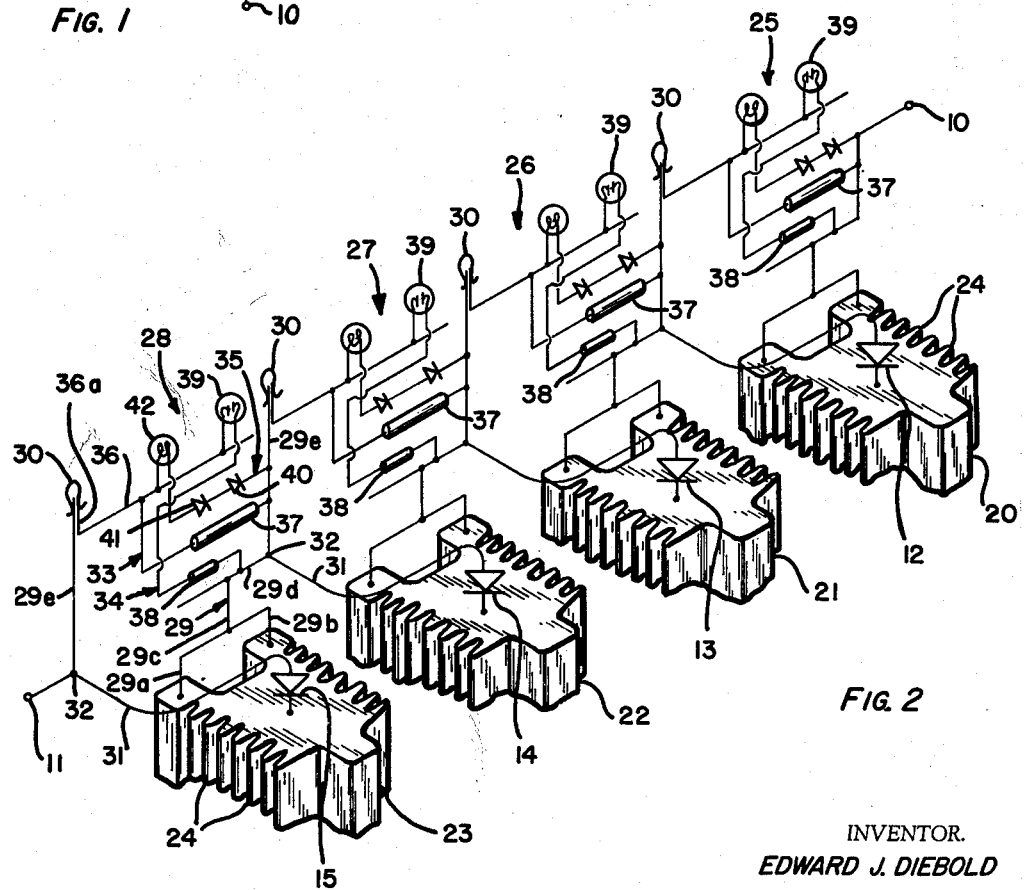
FIG. 2 shows, partly schematically and partly isometrically, the assembly of one of the branches of FIG. 1 together with monitoring systems according to this invention associated with each power rectifier element.

FIG. 2 shows schematically an arrangement according to the present invention for one of the four strings of FIG. 1, for example, the string 16, together with protective circuits therefor. The rectifiers 12, 13, 14 and 15, corresponding to the same numbered rectifier elements in FIG. 1, indicated schematically, represent rectifier elements which will ordinarily be of a power type for the present purpose. They will ordinarily be bolted or otherwise fastened to a suitable base, commonly a heat exchanger such as the heat exchangers 20, 21, 22 and 23 which comprise substantial blocks or masses of a good heat conducting material, preferably provided with fins 24 which facilitate the dissipation of heat flowing from the rectifier element. In order to connect the four rectifier elements in series, each base or heat exchanger is made of electrical conducting material, preferably a conducting metal to which the base terminal of the corresponding rectifier element is attached, and furthermore each base or heat exchanger is connected to the top electrode of the rectifier mounted on the next base.

For the purpose of maintaining terminology, the electrode of the rectifier element which is connected to its heat exchanger or base, is called the base electrode, and the electrode of the rectifier which is unconnected to its own base is herein called the top electrode. In the case of power rectifiers, the top electrode is frequently an anode, and the base electrode is frequently a cathode; although it should be understood that the base electrode may sometimes be an anode and the top electrode may sometimes be a cathode, depending on the physical construction of the rectifier and the nature of its rectifying material. Suitable rectifier elements for the purpose may be the germanium type or the silicon type, both of which are well known and need no detailed description here. A form of rectifier element which may be used, for example, is shown in Kadelburg application 608,634, filed September 7, 1956, it being understood that the mounting and housing arrangement therefor would preferably be modified to adapt it to the particular housing structure shown in the drawings of the present application.

A monitoring system is connected across each of the rectifier elements, these monitoring systems being numbered 25, 26, 27 and 28, for the four respective rectifier elements 12, 13, 14 and 15. All four of the monitoring systems are the same, and accordingly the description of one of them, such as the system 28, will suffice for all.

For the purpose of making connection with the monitoring systems, each base or heat exchanger is provided with an electrical connection or bus 29, shown as comprising a pair of upright arms 29a and 29b, connected for convenience with different parts of base 23, and leading to a common upright portion 29c which in turn connects with a lead 29d which connects with another arm 29e leading upwardly to a connecting clip 30. Accordingly all parts of the bus 29 are connected with the base electrode of rectifier element 15. A lead 31, preferably flexible for this purpose, connects the top electrode of each rectifier element with the bus 29 of the next adjacent rectifier in the series at a point 32 (or to the terminal 11 of the branch in the case of the end rectifier element). By virtue of these connections, all four rectifier elements are connected in series between terminals 10 and 11 to constitute the branch 16 of FIG. 1.

Each monitoring system, for example system 28, comprises three branches, designated as parallel branches 33, 34 and 35 respectively; and these three branches are effectively connected from one clip 30 to the next, that is to say, from one bus 29 to the next. For this purpose, a lead or bar 36 is provided for each monitoring system, and each lead 36 is provided with a hooked portion 36a adjacent the upper end of conductor 29e, so that conductors 29e and 36a are clipped together by the spring clip 30 to be electrically connected with each other.

The monitor branch 33 comprises a resistor 37 connected from bar 36 to bus member 29e of the rectifier 15. The branch 34 comprises a resistor 38 in series with a lamp 39 preferably of the gas-discharge type, such as a neon lamp; and the branch 35 comprises two rectifier elements 40 and 41 in series with a lamp 42.

Referring now to the branch 33, comprising the resistor 37, it will be seen that all four of the resistors 37, connected across the respective rectifier elements are in series with each other between terminals 10 and 11, this series connection being completed through the four clips 30 and the respective bus arms 29e. For the purpose of maintaining substantially equal voltage across the individual rectifier elements in the reverse direction of current flow, all of resistors 37 should be equal. A suitable value for each resistor 37 is about 200,000 ohms, which compares with an approximate reverse resistance for each rectifier element of about 5000 ohms. The very small amount of current flowing through the resistors 37 in the reverse portion of the cycle will have the effect of maintaining substantially equal voltage across the rectifier elements 12 to 15 even if the reverse resistance of all the rectifier elements should not be substantially the same. In the absence of such resistors 37, the voltages across the individual rectifier elements 12 to 15 would divide in proportion to their reverse resistances and thereby tend to place greater voltage across rectifier elements having higher resistance than other of the rectifier elements.

Referring now to the branch 34, comprising resistor 38 and gaseous bulb 39, each resistor 38 should be much less than the value of resistors 37, and may conveniently be about 4000 ohms when the resistors 37 are 200,000 ohms. During the forward part of the cycle on the rectifier element, the voltage across the rectifier is so low that no appreciable current flows through the resistor 38 across it. During the reverse part of the cycle when the voltage across the rectifier is substantial, this higher reverse voltage is sufficient to cause a small, but significant, amount of current to flow through resistor 38 and through the gas-discharge bulb 39, causing the latter to give a faint glow which will appear as a faint red light in the case of a neon bulb. It will be recognized that if the voltage across any one of the rectifier elements 12 to 15 is abnormally high, a higher current flows through its corresponding resistor 38 so that the corresponding neon light becomes brighter. If on the other hand, the voltage across the rectifier element falls below a certain minimum which will be well below the normal reverse voltage, the neon bulb will not glow at all. Accordingly, each of the gaseous glow bulbs gives a visual indication of the voltage division across the respective rectifier elements. If any one of the diode rectifiers 12 to 15 should become short circuited, or have a poor reverse characteristic, the voltage division between the diodes is unbalanced, the poor diode having the lowest voltage, which will result in insufficient voltage available to light up its corresponding neon light bulb 39. Simultaneously, the other neon light bulbs 39 of the branch (which is here considered to be the branch 16), will be subjected to a higher than normal voltage and therefore show more light.

From the foregoing explanation, it is seen that the voltage division across the diode rectifiers 12 to 15 is due to the diodes themselves and the voltage dividing resistors 37, rather than to the indicating circuit comprising the neon light bulb 39 and the resistor 38. Hence, even if there should be a failure of a light bulb 39, which is improbable, such failure would not affect the performance of the rectifier system.

Figure 3:
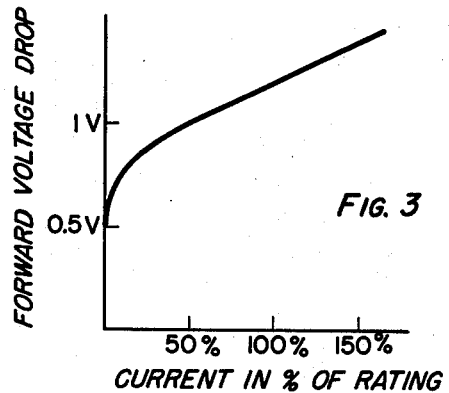
FIG. 3 is a graph showing a typical voltage-current characteristic of rectifiers shown in FIG. 2.

Referring now to the branch 35 of the monitoring system, it is seen that since the two series diodes 40 and 41 (herein called monitoring diodes) of this branch are conected in the same polarity as the main power diode element, such as rectifiers 15, they will be blocking during the part of the cycle when the diode 15 is blocking. Hence, during the reverse part of the cycle no current will be flowing through the filament lamp 42. Assuming the main power diode 15 to be a good diode element, then in the forward part of the cycle it will have a normal forward voltage drop which will be approximately 1.2 volt (in the case of a silicon diode), and this same voltage will appear simultaneously across the branch 35. It is desired that each of the monitoring diodes 40 and 41 shall have approximately the same current-voltage characteristics as the main diode 15, which is easily accomplished by making each of the diodes 40 and 41 of the same material as the main diode 15. Thus, assuming diode 15 to be of the silicon type, each of the diodes 40 and 41 is preferably of the silicon type. Since the full forward voltage across diode 15 is now distributed across the three elements 40, 41 and 42, the voltage across each diode 40 and 41 is less than half that across the main diode 15. As a typical example, the filament lamp 42 can conveniently be of a resistance which will produce about .2 volt across it and about .5 volt across each of diodes 40 and 41 when the forward voltage across the main diode 15 is at a normal value of about 1.2 volts. Since less than half the normal voltage of 1.2 volts is appearing across each monitoring diode 40 and 41 (which have the same voltage-current characteristics as the main diode), the current through the monitoring diodes is practically zero because of the non-linear characteristic of such a diode. The characteristic of all of the silicon diodes 15, 40 and 41 is shown in FIG. 3, from which it can be seen that no appreciable current starts to flow in the forward direction until the forward voltage exceeds .5 volt. For these values the filament bulb 42 can conveniently be selected as one rated at 2 volts and a 60 milliampere current for full normal lighting. Hence, with only .2 volt across the lamp, the current through it will be too small to produce any light effect at all. Therefore, under normal circumstances the light bulb 42 will show no light.

It is apparent that if the series circuit through the main diodes 12, 13, 14 and 15 becomes open anywhere between terminals 10 and 11, as for example by the opening of the connection between the base of one of these diodes and its heat exchanger, the entire branch will become inoperative. Assuming that this inoperativeness exists in the branch 16 normal current will not flow through this branch, but instead normal current flow will be confined to the other branches such as branches 17, 18, and 19 (FIG. 1). The monitoring system, however, will immediately show that branch 16 has a defective element and will point to the particular rectifier element which is defective. Assume for example that diode 15 is open-circuited. Under this condition, the voltage appearing in the forward direction across its monitoring system will be much higher than normal. Under normal conditions, there is a forward voltage of 1.2 volt per diode (for the example under consideration) which creates 4.8 volts across terminals 10 and 11. Assuming diode 15 to be the faulty one, it will not pass any current; and the only current flowing between terminal 11 and the next power diode 14 will be that permitted to pass through the monitoring system of diode 15. In the forward direction, this will be essentially the current through branch 35; and since there are two monitoring diodes 40 and 41, in addition to the filament lamp 42 in series in this branch, the resistance of branch 35 is substantially higher than that which diode 15 would have if it were operating normally. Accordingly, the current flow through branch 16 between terminals 10 and 11 in the forward direction is now reduced from its normal value. Hence, the voltage across the remaining good diodes 12, 13 and 14 will be reduced from their normal values; and in the example which is under discussion the voltage across each of these good diodes will be approximately .5 volt, leaving about 3.3 volts across the monitoring system of faulty diode 15. The two diodes 40 and 41 in the monitoring system of power diode 15 are subjected to a much higher current than normal, in view of this higher voltage across them; and in the example being considered there will be a forward voltage drop of about .9 volt across each of these monitoring diodes 40 and 41, leaving a voltage of about 1.5 volts across the bulb 42. Under this circumstance a much higher current than normal flows through bulb 42; and in the example of the bulb rated at 60 milliamperes and 2 volts, there will be produced a current of about 40 milliamperes through the filament of the bulb which is sufficient to light it brilliantly. Since the lighting effect of the filament bulb is proportional to the square of the current through it, it will be recognized that the bulb is extremely sensitive to changes of current. The brightness of the bulb 42 will point to the defective power diode.

It will be recognized that the monitoring system provides an extremely sensitive means for indicating the condition of the main power rectifier units. The branch 35 of each main diode, due to the current-limiting effect of monitoring diodes 40 and 41 as determined by the non-linear characteristic of these diodes, is extremely sensitive to changes of current through the branch such as branch 16 of the power rectifier system. Likewise the branch 34 is extremely sensitive to change of voltage across the corresponding power rectifier diodes. Whenever any one of the main power diodes shows a significant increase in forward voltage drop due to load current, corresponding lamp 42 immediately lights up to indicate that the performance is abnormal.

A preferred assembly for the rectifying and monitoring system shown in FIG. 2 is illustrated in FIG. 4, wherein two of the main rectifier units and their monitoring arrangements are illustrated. In FIG. 4 the same numbers are in general used to designate the same parts as in FIG. 2. In FIG. 4 the two units are assumed to be the main rectifier units 14 and 15 and their respective monitoring systems 27 and 28. The power diodes 14 and 15 are shown as being of a conventional type such as has been commonly used for silicon and germanium diodes. According to general practice the base electrode of such a diode is attached to the main housing or supporting means for the diode, which in this case is provided with an external hexagonal nut 45 from which there depends a threaded stud 46 threaded into a tapped hole 47 of the heat exchanger 22 or 23. This mounting or supporting structure and depending stud of the diode are of a metal having sufficient mass and heat conducting qualities so that heat is readily conducted away from the active elements of the rectifier to the heat exchanger. To the top electrode of the power diode there is attached a suitable electrical coupling means 48 which connects the top electrode to the flexible cable 31.

Each of the monitoring systems as 27 and 28 is mounted on a suitable electrically conducting support 49 which can be provided for example by extruding a bar of metal such as aluminum in the shape illustrated. This comprises a base portion 50 having a depending stem 51 with a footing 52. At one side there extends upwardly from the base portion 50 a wall 53 terminating in a lip 53a and at the other side a somewhat similar wall 54 is brought upward from the base except that the wall 54 does not extend upwardly as far as the wall 53. At a position somewhat above the upper end of the wall 54 there is placed a metallic strap 55 which is maintained out of contact with any part of the support 49. The width of strap 55 and also the width of the other parts of support 49 such as the uprights 53 and 54 and the base portion 50 are maintained of the same dimensions; and this dimension is preferably just large enough so that the strap 55 will conveniently support a pair of small lamp sockets 56 and 57, as shown in the top view, FIG. 5. The base of each of these lamp sockets is provided with a depending member 58 which pases through a hole in the strap 55 so that the socket is held in place by a washer 59 and a nut 60 threaded over this depending member. The socket 56 receives the lamp 42 and the socket 57 receives the lamp 39. The outer, or shell portion of each of the sockets 56 and 57 is designed to make contact with one terminal 61 of its lamp and also to the strap 55. The other terminal of each lamp is its inner terminal according to common lamp construction, which makes connection with a suitable interior contact of the respective socket which is brought out through a central tube 62 of the socket in the form of an electrical lead. The lead from socket 57 is numbered 63, which connects with resistor 38 in branch circuit 34. The opposite terminal of this resistor is connected by a lead 64 to the upright member 53 to which it is attached as by soldering. Lead 66 from the inner terminal of socket 56 is connected to one terminal of monitoring diode 41, the other terminal of which is connected by a suitable lead 67 to a terminal of the related monitoring diode 40, the other terminal of which is connected with upright member 53 by a lead 68. There is connected, as by soldering, to the strap 55, a lead 69 which connects with one terminal of resistor 37 in branch 33, the other terminal of the resistor being connected by a lead 70 to upright 53.

The elements of the monitoring system such as 27 as thus described can be assembled by placing them in a suitable mold (not shown) with the strap 55 in its relative position to the support member 49 as shown in FIG. 4. In this position, a suitable plastic, preferably a thermosetting resin, is poured into the mold in molten condition. Preferably the mold comprises a pair of parallel sides placed along opposite sides of members 53 and 54, so that by holding the mold upright and pouring the liquid plastic, the plastic will be brought to the level 71, sufficient to embed both edges of the members 50, 53, 54 and 55 and maintain them in their position. Since the plastic fills the volume containing these members, it will cover the connections of the leads 69, 64, 70 and 40, presenting a smooth finish such as the flat surface 72 shown for the monitoring system 28 in FIG. 4.

The base portion 50 of member 29 is provided with a tapped hole 73 which is kept free from being filled or plugged by the plastic. This tapped hole is adapted to receive a screw 74 which holds the terminal lug 75 attached to flexible cable 31, so that the cable 31 is securely electrically connected with the member 49 of the adjacent monitoring system. The outer end of each strap 55 is bent upwardly to form an upwardly extending end portion 76, herein called a connecting member, which is adapted to have its side contact the adjacent side of the lip 53a of member 53 of the next adjacent monitoring system. Electrical and mechanical connection of these members 53 and 76 is firmly secured by means of spring clip 30 which is adapted to be snapped on or off to connect or disconnect these adjacent monitoring systems from each other.

The entire rectifying and monitoring assembly is supported on a suitable bar or plate 78 which is preferably of electrical insulating material, and if it is not made of insulating material it should be insulated from the respective electrical component in order to prevent short-circuiting. The mounting on this supporting bar is provided by a pair of bolts 79 and 80 for each main diode unit. These two studs pass through corresponding holes at opposite sides of the footing 52 of the supporting member 49 and through similar aligned holes of the bar 78, and are threaded into respective tapped holes 81 and 82 of the heat exchanger. In order to provide a desired spacing of the parts, tubular members 83 and 84 may be provided around the studs at opposite sides of the supporting bar 78. By tightening nuts 85 and 86 on the upper threaded ends of the studs, the assembly may be tightly secured.

To put the system into operation, the electric lamps 39 and 42 are set into their respective sockets. It will be recognized that the strap portion 76 of each monitoring unit corresponds with the lead 36a of FIG. 2, and that the upper end of member 53 corresponds with the bus bar 29e. Thus, all of the units can be connected in their series arrangement shown in FIG. 2 by applying all the clips 30 to the units of the branch and by connecting all of the flexible leads 31 of each main rectifier unit to the next adjacent unit by the screw 74. It is seen that the bolts 79 and 80 correspond with the respective bus legs 29a and 29b of FIG. 2 and that the central supporting member 51 corresponds with the bus leg 29c of FIG. 2. Hence by connecting the member 53 at the right end of the chain, to terminal 10, and by connecting the member 76 at the left end of the chain to the other terminal 11, the series branch is complete.

It is seen that by reason of the construction described, any unit of the system, either a main diode unit or a monitoring unit may be replaced at will. This is done by simply removing the nuts 85 and 86 of the supporting studs 79 and 80 of the particular unit, which will immediately allow a monitoring system such as system 27 to be removed and replaced (by removing the associated clips 30 and by removing the screw 74 for the flexible lead). This will also allow the corresponding main diode unit to be replaced if that should be desired.

It will be recognized that by my invention there is provided a unique and highly effective arrangement for giving a ready indication of the performance of the component elements of a power converter; and there is furthermore provided a quick and simple means for effecting replacements. It should be understood that the invention is not limited to the particular structures and arrangements shown in the drawing and in the detailed description, which are given by way of illustration rather than of limitation. Various modifications within the scope of the invention may suggest themselves to those skilled in the art. The invention is not limited except in accordance with the scope of the appended claims.

What is claimed is:

1. A monitoring system for a rectifying element comprising the combination of a first rectifier, a second rectifier and an indicator; said first rectifier, said second rectifier, and said indicator being connected in series with one another; said series connection of said first and second rectifier and said indicator being connected directly across said rectifying element, and operatively related thereto to provide means indicating the forward voltage magnitude across said rectifying element, said first and second rectifier circuit arranged to the same polarity as said rectifying element.

2. The system as set forth in claim 1 wherein said first rectifier and said second rectifier have the same voltage-current characteristic as that of said rectifying element.

3. A monitoring system for a plurality of series connected power rectifying elements; said monitoring system comprising monitoring means for each of said power rectifier elements; each of said monitoring means including a first rectifier, second rectifier and an indicator; each of said first rectifier, second rectifier and indicator of each of said monitoring means connected in series with one another; each of said series connections of said first rectifier, said second rectifier and said indicator being connected directly across their respective power rectifier element of said plurality of power rectifier elements; each of said first and second rectifiers circuit arranged to the same polarity as their respective power rectifier element, each of said monitoring means further including a first resistor, a second resistor and a second indicator means; each of said first resistors of each of said monitoring means being connected directly across its respective power rectifier element; each of said second resistors and second indicators of each of said monitoring means being connected in series with one another and directly across their respective power rectifier of said plurality of power rectifier element, each of said second resistor being of a considerable lesser magnitude than said first resistor of its respective monitoring means.

4. In combination; a support structure and a monitoring system for a power rectifier; said support structure comprising a conductive base support receiving one end of said power rectifier element; said base support having a footing; said support structure having a protruding lip extending therefrom and in electrical contact with said base support; an electrical contactor having a connecting member supported in fixed relation with respect to said protruding lip; said monitoring system including indicating circuit means connected between said lip and said connecting member; and clip means for clipping said connecting member to the lip of an adjacent and identical assembly, said monitoring system and its associated power rectifier forming a unit, circuit connectable to an adjacent unit by the fastening of said clip means and means electrically connecting said one end of said power rectifier element to the conductive base support of the adjacent unit.

5. The monitoring system as set forth in claim 3, wherein said indicator comprises a filament type indicating lamp, and said second indicator means comprises a gas discharge type lamp.

6. In combination; a support structure and a monitoring system for a power rectifier; said support structure comprising a base support and a member having a protruding lip extending therefrom; an electrical contactor having a connecting member held in spaced insulated relation with respect to said protruding lip; said monitoring system including a resistor connected between said lip and said connecting member; said monitoring system further including a first rectifier, a second rectifier and an indicating means connected in series with one another; said series connection being connected between said lip and said connecting member; said monitoring system further including the series connection of a first and second resistor and a second indicating means; said series connected first resistor, second resistor and second indicating means being connected between said lip and said connecting member.

7. The device as substantially set forth in claim 6 wherein the components of said monitoring system are embedded in a sealing compound.

8. A monitoring system for a rectifying element; said monitoring system including a first resistor; said first resistor being connected directly across said rectifying element; a second resistor and a filament type indicating lamp in series with one another; said second resistor being of a considerably lesser magnitude than said first resistor; said series connected resistor and lamp being connected directly across said rectified element; said monitoring system further including the series connection of a first rectifier, a second rectifier and a gas discharge type lamp; said series connected first rectifier, second rectifier and gas discharge lamp being connected directly across said rectifier element; said first and second rectifiers circuit aranged to the same polarity as said rectifying element.

References Cited by the Examiner
UNITED STATES PATENTS

| | | | |
|---|---|---|---|
| 2,679,037 | 5/54 | O'Keefe | 340—248 |
| 2,689,286 | 9/54 | Pulvari | 340—248 |
| 2,693,566 | 11/54 | Hooper | 321—12 |
| 2,760,142 | 8/56 | Hitchcock | 321—27 |
| 2,807,771 | 9/57 | Winograd | 321—14 |
| 2,862,992 | 12/58 | Franz | 174—52.6 |
| 2,911,572 | 11/59 | Francis et al. | 317—101 |
| 2,930,961 | 3/60 | Lezan | 321—14 |
| 2,935,676 | 5/60 | Keltz | 321—11 |
| 3,018,417 | 1/62 | Colaiaco et al. | 340—248 XR |
| 3,021,515 | 2/62 | Christian | 340—253 |
| 3,045,224 | 7/62 | Colaiaco | 340—250 |

NEIL C. READ, *Primary Examiner.*

ROBERT H. ROSE, E. JAMES SAX, EVERETT R. REYNOLDS, *Examiners.*